Dec. 11, 1962     G. H. WINSLOW     3,067,664
CAMERA ACCESSORIES
Filed June 24, 1960
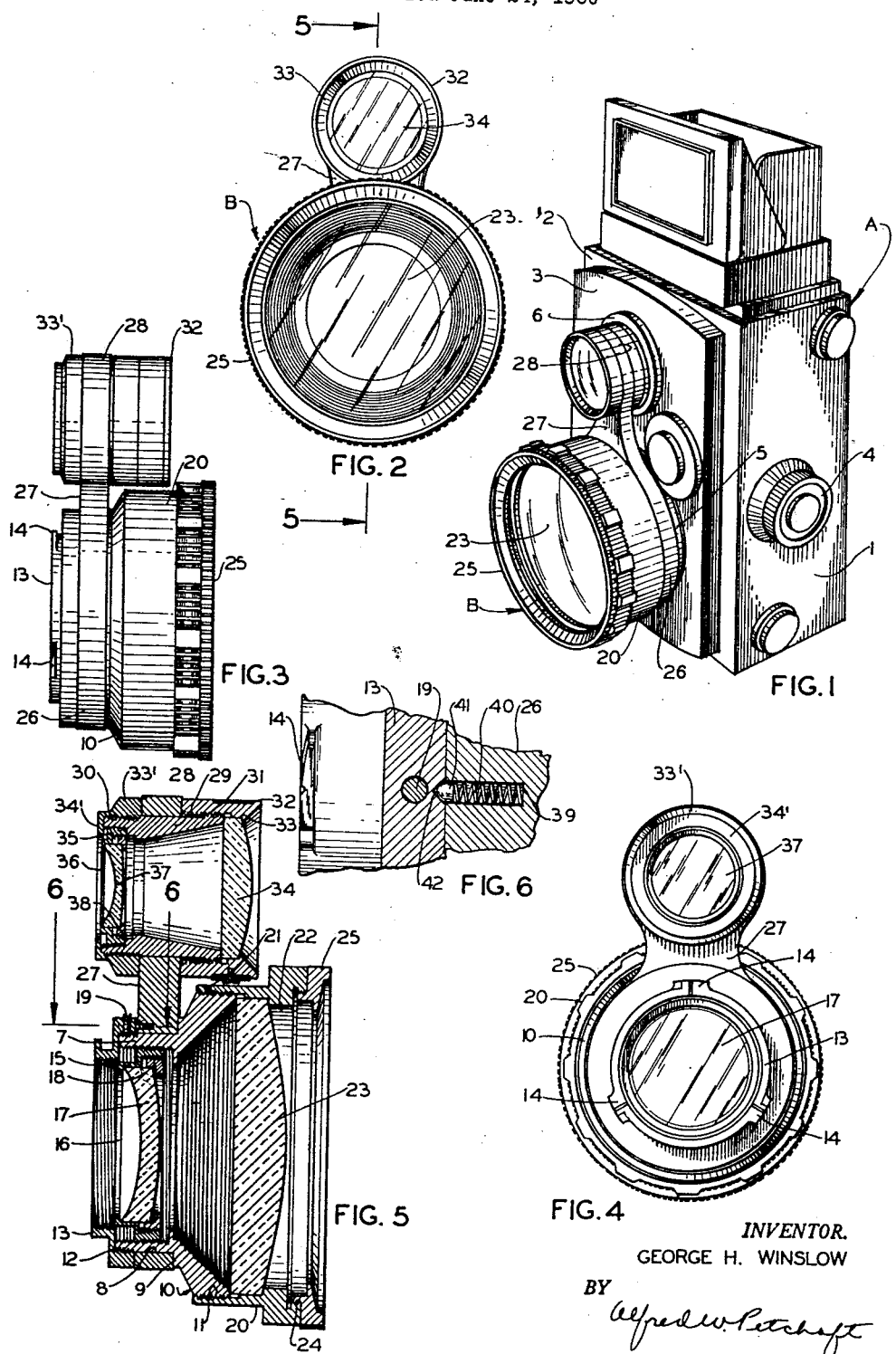
INVENTOR.
GEORGE H. WINSLOW
BY
*Alfred W. Petcheft*
ATTORNEY

United States Patent Office 3,067,664
Patented Dec. 11, 1962

3,067,664
CAMERA ACCESSORIES
George H. Winslow, University City, Mo., assignor to Kalimar, Inc., St. Louis, Mo., a corporation of Missouri
Filed June 24, 1960, Ser. No. 38,591
1 Claim. (Cl. 95—44)

This invention relates in general to certain new and useful improvements in cameras, and more particularly to wide angle and telephoto lenses, particularly adapted for use with twin lens reflex cameras.

In recent years, the so-called twin lens reflex camera has become extremely popular among camera users and photographers. Such cameras include a primary lens which focuses the image directly upon the sensitized film and a secondary lens which focuses the same image upon a viewing screen. The image upon the viewing screen is ordinarily of exactly the same size and is otherwise substantially identical with the image imposed upon the film by the primary lens. Thus, the camera user is able to see exactly the image which will be imposed upon the sensitive film or negatives and can thereby avoid many of the errors commonly encountered in the taking of photographs. In fact, the twin lens reflex camera has the advantage that the camera user can always see the picture being taken, even during the instant that the shutter is being released.

Another advantage inherent in twin lens reflex cameras resides in the fact that the primary lens and secondary lens are coupled so that the focusing mechanism which adjusts the primary lens will simultaneously adjust the secondary lens. Therefore, it is possible to observe visually the sharpness and accuracy of focus by observing the image cast on the viewing screen. The primary lens and secondary lens are, of course, related so as to have identical focal lengths and the focusing mechanism is usually provided with means for obviating parallax between the primary lens and the secondary lens. The mechanical, as well as optical inter-relation between the primary lens and secondary lens of a twin lens reflex camera, however, creates a serious problem when it becomes necessary to use auxiliary lenses such as telephoto lenses and wide angle lenses.

If, for example, a conventional type of wide angle or telephoto lens is applied to the primary lens of a twin lens reflex camera, the secondary lens will not function as a focusing device. It, therefore, becomes necessary to apply a supplemental lens in front of the secondary lens so that the secondary lens system will be brought into optical conformity with the lens system resulting from the combination of the primary lens and the telephoto or wide angle lens applied thereto. Consequently, if a user of a twin lens reflex camera desired to employ a telephoto lens, for instance, it is now necessary for such user to purchase and employ a matched set of lenses consisting of a telephoto lens to be mounted in front of the primary lens and a supplemental lens to be mounted in front of the secondary lens.

This necessity for dual lenses involves several difficulties. In the first place, it is inconvenient and time consuming to attach one lens in front of the primary lens of the camera and a supplemental lens in front of the secondary lens of the camera. Furthermore, twin lens reflex cameras are not ordinarily constructed with any suitable arrangement for accepting a supplemental lens in front of the secondary lens. In addition to this, camera users who have need for wide angle lenses and telephoto lenses usually also employ various types of filters and other lens attachments which they carry around in a camera bag together with the camera itself, so that the supplemental lens can, rather easily, become mixed up with filters and other similar accessory devices with the result that the camera user may have to take the time to sort out several different objects to find the particular supplemental lens which must be used.

It is, therefore, the primary object of the present invention to provide a unitary auxiliary lens system for a twin lens reflex camera which can be quickly and conveniently mounted on such a camera and will, in a single device, provide means for optically modifying both the primary lens and the secondary lens of such camera.

It is another object of the present invention to provide an auxiliary lens system of the type stated which is compact, integrated, and economical.

With the above and other objects in view, my invention resides in the novel features of form, construction, arrangement, and combination of parts presently described and pointed out in the claim.

In the accompanying drawing (one sheet)—

FIG. 1 is a perspective view of a twin lens reflex camera equipped with an auxiliary lens system constructed in accordance with and embodying the present invention;

FIG. 2 is a front elevational view of the auxiliary lens system;

FIG. 3 is a side elevational view of the auxiliary lens system;

FIG. 4 is a rear elevational view of the auxiliary lens system;

FIG. 5 is a vertical sectional view taken along line 5—5 of FIG. 2; and

FIG. 6 is a fragmentary sectional view taken along line 6—6 of FIG. 5.

Referring now in more detail and by reference characters to the drawing, which illustrates a preferred embodiment of the present invention, A designates a twin lens reflex camera which may be of any conventional construction and design and, generally speaking, comprises a camera shell or housing 1 operatively provided upon its forward wall 2 with a horizontally shiftable lens-mounting plate 3 operatively connected by a conventional mechanical arrangement to a focusing knob 4. This mechanical arrangement is not described or disclosed herein since it may be of any conventional type and is not a part of the present invention. The lens-mounting plate 3 is provided with a primary or "taking" lens system 5 and a view finding lens system 6, both of which are also conventional and, therefore, are not described or shown in specific detail herein. It is sufficient, however, for present purposes to note that the primary lens system 5 is conventionally provided with a bayonet-type mounting ring of the usual type for receiving and holding various attachments which may optionally be disposed in front of the primary lens system.

Provided for use with the twin lens reflex camera A is an auxiliary lens system B which comprises the main ring 7 formed preferably of suitable metal and integrally including an external annular bearing surface 8 which terminates at its forward end against a rearwardly presented concentric abutment shoulder 9. Forwardly of the abutment shoulder 9, the ring 7 is flared outwardly in the provision of a conical light sleeve 10 which is externally provided with a threaded terminal portion 11. At its rearward end the bearing surface 8 terminates against a diametrally reduced externally threaded portion 12 for threaded engagement with a mounting ring 13 provided at 120° intervals around its periphery with radially projecting bayonet-tongues 14 which are adapted for engagement in bayonet slots of the lens system 5, the latter being conventional and, therefore, not being shown.

The sleeve 7 is internally threaded for receiving an externally threaded rear-lens ring 15 integrally formed with a shallow depending annular flange 16 for engagement with the rearwardly presented margin of a rear lens 17, which is, in turn, retentively held around its forwardly presented annular margin by a retainer ring 18 threadedly mounted within the ring 15. As will be seen by reference to FIG. 5, the ring 15 is held fixedly in assembled position by means of a set-screw 19.

Threadedly mounted upon the terminal portion 11 is a forward retainer ring 20 held in place by a set-screw 21 and which is integrally provided with a depending annular flange 22 which bears against the forward annular margin of a front lens 23 and holds the latter securely against the light sleeve 10. At its forward end, the retainer ring 20 is counterbored and internally threaded to provide an annular flange 24 which optionally receives an accessory ring 25. It will, of course, be obvious, in this connection, that the two lenses 17 and 23 may be ground to provide a wide angle lens system, a telephoto lens system, or, for that matter, any other auxiliary lens system which may be desired, and the optical formulate for such lenses will, of course, be consistent with the primary lens system of the camera.

Rotatably mounted upon the bearing surface 8 is an auxiliary ring 26 having an integrally formed radially projecting arm 27 which terminates in a smaller ring 28. Mounted in and carried by this ring 28 is a lens tube 29 provided at its opposite ends with externally threaded portions 30, 31. Threadedly mounted upon the threaded portion 31 is a lens collar 32 having a depending annular flange 33 which bears against the forward marginal portion of a lens 34 holding it securely against the forwardly presented end face of the lens tube 29, as best seen in FIG. 5.

Threadedly mounted upon the threaded portion 30 at the rear end of the lens tube 29 is a locking collar 33' which is integrally provided with a depending annular flange 34' for endwise abutment against the rearwardly presented face of the lens tube 29. It will be noted by reference to FIG. 5 that the lens collar 32 and the locking collar 33' are drawn up tight into respective endwise abutment on opposite sides of the ring 28, so that the lens tube 29 is thereby rigidly held in place. At its rear end the lens tube 29 is counterbored and internally threaded for receiving a lens ring 35 which is also provided with a narrow inwardly extending annular flange 36 for retentive abutment against the rearwardly presented margin of a lens 37, thereby firmly held in place around its forwardly presented annular margin against a retainer ring 38 which is, in turn, threadedly seated within the lens ring 35. The lenses 34 and 37 are also optically matched to correspond with the lenses 23 and 17 in such manner that when the primary lens system of the camera is shifted for focusing purposes, the image thrown on the viewing screen will be coordinately focused.

The auxiliary ring 26 is axially drilled from its rearwardly presented face to provide a small tubular recess or socket 39 for receiving a small compression spring 40 which abuts, at its forward end, against a hemispherical detent-element 41 which may be optionally seated within a companion-shaped recess 42 formed in the adjacent concentric face of the mounting ring 13. The recess 42 is located in relation to the bayonet-tongues 14 so that when the latter are properly inserted and twisted tightly into place on the camera A, the ring 26 and its associated structure may be swung around until the detent-element 41 clips into place within the recess 42. When this occurs the lenses 34 and 37 will be positioned precisely along the optical axis of the secondary lens of the camera A. Since the auxiliary ring 26 is otherwise free to rotate with respect to the bearing surface 8 it is possible to mount the auxiliary lens system B upon the camera A very quickly and conveniently without regard to the position of the auxiliary ring 26 and the lenses 34 and 37 supported thereby. Then, after the mounting or attachment operation has been completed, the auxiliary ring 26 can be accurately positioned. It should be noted in this connection that although only one recess 42 is shown in the drawings, there are, obviously, three such recesses respectively corresponding to the bayonet-tongues 14 and, consequently, the auxiliary ring 26 can be accurately located no matter how the mounting ring 13 may happen to be attached to the camera A.

It should be understood that changes and modifications in the form, construction, arrangement, and combination of the several parts of the camera accessories may be made and substituted for those herein shown and described without departing from the nature and principle of my invention.

Having thus described my invention, what I claim and desire to secure by Letters Patent is:

For use with a twin lens reflex camera having a primary lens mount, a primary lens, and a view finding lens; an auxiliary lens system, said system comprising a sleeve, said sleeve having a diametrally enlarged, externally threaded portion, lens retaining means threadedly secured to the diametrally enlarged portion, a first auxiliary lens mounted in and carried by the lens retaining means for optical cooperation with the primary lens, a lens ring secured to the other end of said sleeve, a second auxiliary lens mounted in said lens ring and optically cooperating with said first auxiliary lens, mounting means secured to the sleeve for optionally attaching the sleeve to the primary lens mount, said sleeve having an annular outwardly presented bearing surface, an auxiliary ring rotatably mounted on said bearing surface, said ring having a radially projecting element, a supplementary lens ring secured to the outer end of said radially projecting element, a tubular member mounted within said supplementary lens ring, a first matching supplementary lens mounted within and carried by the tubular member for optical cooperation with the view finding lens, a second supplementary lens mounted within said tubular member for optical cooperation with said first supplementary lens, said supplementary lens ring being spaced from the auxiliary lenses at such distance that it may be precisely aligned with the optical axis of the view finding lens of the camera, and detent means located in spaced relation to the mounting means for indicating when said supplementary lens ring is thus aligned.

References Cited in the file of this patent

UNITED STATES PATENTS

| | | |
|---|---|---|
| 2,674,932 | Tydings | Apr. 13, 1954 |
| 2,926,577 | Albrecht | Mar. 1, 1960 |
| 2,999,444 | Miyauchi | Sept. 12, 1961 |